United States Patent
Itakura et al.

(10) Patent No.: US 6,627,843 B2
(45) Date of Patent: Sep. 30, 2003

(54) CASING FOR LASER DEVICE, PRODUCTION METHOD AND CLEANING METHOD OF THE SAME

(75) Inventors: Yasuo Itakura, Hiratsuka (JP); Fumika Yoshida, Hiratsuka (JP); Osamu Wakabayashi, Hiratsuka (JP)

(73) Assignee: Arms Komatsu Ltd., Tokyo (JP)

(*) Notice: Subject to any disclaimer, the term of this patent is extended or adjusted under 35 U.S.C. 154(b) by 0 days.

(21) Appl. No.: 09/969,782

(22) Filed: Oct. 4, 2001

(65) Prior Publication Data
US 2002/0041617 A1 Apr. 11, 2002

(30) Foreign Application Priority Data
Oct. 6, 2000 (JP) ....................................... 2000-307131

(51) Int. Cl.[7] .............................................. B23K 26/36
(52) U.S. Cl. ................................................ 219/121.69
(58) Field of Search ...................... 219/121.69, 121.68, 219/121.8, 121.67, 121.86, 121.75; 372/57, 59

(56) References Cited
FOREIGN PATENT DOCUMENTS

| JP | 60-107877 | * | 6/1985 |
| JP | 2-164086 | * | 6/1990 |
| JP | 3-78268 | * | 4/1991 |
| JP | 11-116281 | * | 10/1997 |
| JP | 10-284774 | * | 10/1998 |
| JP | 11-277286 | * | 10/1999 |
| JP | 2000-82856 | | 3/2000 |
| JP | 2001-59892 | * | 3/2001 |
| JP | 2001-358386 | * | 12/2001 |

OTHER PUBLICATIONS

High–Performance Semiconductor Process Basic Technology Development; Association of Super–Advanced Electronics Technologies, May 2000 (Heisei 12).

* cited by examiner

Primary Examiner—Tom Dynn
Assistant Examiner—Jonathan Johnson
(74) Attorney, Agent, or Firm—Armstrong, Westerman & Hattori, LLP.

(57) ABSTRACT

A casing for a laser device in which contaminants do not generate even if it is radiated with laser light, a production method and a cleaning method of the same are provided. For this purpose, the cleaning method is a method of cleaning a casing (19) for an ultraviolet laser device, an inside of which laser light (11) passes through, comprises the steps of purging the inside of the casing (19) with an inert gas, and radiating F2 cleaning laser light (16) oscillated from an F2 molecular laser light radiating device (15) to the inside of the casing (19) to thereby remove contaminants adhering to the inside of the casing (19).

8 Claims, 7 Drawing Sheets

US 6,627,843 B2

CASING FOR LASER DEVICE, PRODUCTION METHOD AND CLEANING METHOD OF THE SAME

TECHNICAL FIELD

The present invention relates to a casing for a laser device, an inside of which laser light passes through, a production method and cleaning method of the same.

BACKGROUND ART

A cleaning device for cleaning optical components by radiating laser light is conventionally known, and it is disclosed, for example, in Japanese Patent Application Laid-open No. 2000-82856. FIG. 6 shows the cleaning device disclosed in Japanese Patent Application Laid-open No. 2000-82856, and the prior art will be explained below based on FIG. 6.

In FIG. 6, the cleaning device includes a laser oscillator 101 for oscillating cleaning laser light 102 having a wavelength of an ultraviolet range, a housing chamber 103 for housing an optical component 104, a gas introduction mechanism 105 for supplying a gas into the housing chamber 103, and a gas exhaust mechanism 106 for exhausting the gas inside the housing chamber 103.

On cleaning, the optical component 104 is placed in the hermetically sealed housing chamber 103, and while an oxygen gas is being introduced into the housing chamber 103 from the gas introduction mechanism 105, the oxygen gas is exhausted by the gas exhaust mechanism 106. Subsequently, the cleaning laser light 102 oscillated from the laser oscillator 101 is shaped in beam shaping means 108, and is radiated to the optical component 104 via windows 107 and 107. As a result, ozone and oxygen radicals generate from oxygen, and contaminants such as organic matters and the like adhering to the optical component 104 undergo oxidative decomposition and are discharged, whereby the optical component 104 is cleaned. By performing the cleaning as described above, transmittance of the optical component 104 is increased, and its life is increased.

However, the prior art disclosed in the aforementioned Japanese Patent Application Laid-open No. 2000-82856 has the following disadvantage.

FIG. 7 shows a schematic block diagram of an excimer laser device 109. The excimer laser device 109 includes a laser chamber 112, a front mirror 115, a band-narrowing unit 120 for narrowing a bandwidth of laser light 111, and a monitor module 116 for measuring properties of the laser light 111. The band-narrowing unit 120 includes a band-narrowing box 121, and an optical component 113 is placed therein. The monitor module 116 includes a monitor box 117, and an optical component 114 is placed therein. Further, a light path of the laser light 111 is covered with a cover 119 for preventing the laser light 111 from filtering outside. Hereinafter, the monitor box 117, the cover 119 and the band-narrowing box 121 for covering the light path of the laser light 111 are generally referred to as the casings 117, 119, and 121.

The laser light 111 is irregularly reflected at surfaces of the optical components 113 and 114 or refracted at insides thereof, and strikes inner walls of the casings 117, 119 and 121. In this situation, contaminants such as organic matters and the like also adhere to the inner walls of the casings 117, 119 and 121. Consequently, there arises the disadvantage that the contaminants adhering to the inner walls of the casings 117, 119 and 121 chemically react and are vaporized to adhere to the optical components 113 and 114, thereby contaminating and damaging them.

In addition, the inner walls of the casings 117, 119 and 121 have larger surface area as compared with the optical components 113 and 114, and an amount of adhering contaminants is larger. Accordingly, there arises the necessity to not only clean the optical components 113 and 114 but also remove the contaminants from the inner walls of the casings 117, 119 and 121. Furthermore, optical component holders not shown for moving and fixing the optical components 113 and 114 to set optical axis are placed inside the casings 117, 119 and 121. The optical component holders are complicated in their shapes and have large surface areas, and a lot of contaminants are also adhering to their surfaces. Consequently, the optical component holders also need to be cleaned.

In the prior art, an article to be cleaned is put into the housing chamber 103, and then is radiated with the cleaning laser light 102. However, the casings 117, 119 and 121 are much larger as compared with the optical components 113 and 114, and therefore the huge housing chamber 103 is required to house them. In addition, coatings for keeping fine appearance are applied to or seals and the like for calling attention to how to use are stuck on outer walls of the casings 117, 119 and 121. Accordingly, even if the casings 117, 119 and 121 are put into the housing chamber 103 and are radiated with laser light, a large quantity of organic matters generate from the outer walls, whereby the inner walls and the optical components 113 and 114 inside them are contaminated and damaged.

Further, according to the prior art, oxygen is fed into the housing chamber 103 and the cleaning laser light 102 is radiated. Components used in an F2 laser device need to be cleaned by an F2 molecular laser light oscillated from the F2 laser device or cleaning laser light of a shorter wavelength with higher light quantum energy. This is because even if the casings 117, 119 and 121 are cleaned by cleaning laser light of a longer wavelength, if they are radiated with the F2 molecular laser light with higher light quantum energy again, contaminants generate therefrom.

However, the F2 molecular laser light is absorbed in oxygen very well and attenuated. Therefore, if the F2 molecular laser light is used as the cleaning laser light 102, the cleaning laser light 102 sometimes does not reach the inner walls of the casings 117, 119 and 121 in the atmosphere containing oxygen, and thus the effect of cleaning is reduced. Specifically, in the air or in an oxygen atmosphere, it is difficult to use the F2 molecular laser light as the cleaning laser light 102 and thus it is difficult to apply the prior art to the components of the F2 laser devices.

SUMMARY OF THE INVENTION

The present invention is made in view of the above-described disadvantage, and its object is to provide a casing for a laser device, in which contaminants do not generate even if laser light is radiated, a production method and a cleaning method of the same.

In order to attain the above-described object, a casing for a laser device according to the present invention is a casing for a laser device, an inside of which laser light passes through, and has a configuration in that the inside is previously radiated with cleaning laser light.

According to the above configuration, contaminants adhering to an inner wall of the casing and components therein such as optical component holders and the like can be isolated by radiation of the cleaning laser light. Accordingly, by removing the isolated contaminants, the inside of the casing can be cleaned. Specifically, when the casing is incorporated into the laser device, even if the inside of the casing is radiated with laser light, generation of contaminants is reduced. As a result, it hardly happens that the optical components placed in the inside of the casing are contaminated and damaged, thus reducing the occurrence of power reduction of the laser light and increasing the lives of the optical components.

Further, in the casing for the laser device, the inside may be purged with a predetermined purge gas at a time of the radiation of the cleaning laser light.

According to the above configuration, at the time of the radiation of the cleaning laser light, the purge gas is exhausted, whereby the casing has the isolated contaminants exhausted form the inside. Accordingly, the casing with the inside being clean is provided.

A method of producing a casing for a laser device according to the present invention is
a method of producing a casing for a laser device, an inside of which laser light passes through, and includes
a radiating step of radiating the inside with cleaning laser light; and
a purging step of purging the inside with a predetermined purge gas at a time of the radiation of the cleaning laser light.

According to the above production method, the contaminants adhering to the inside of the casing are isolated by radiation of the cleaning laser light, and on this occasion, the isolated contaminants are discharged from the inside of the casing by exhausting the purge gas. Accordingly, the casing with the inside being clean can be produced.

A method of cleaning a casing for a laser device according to the present invention is
a method of cleaning a casing for a laser device, an inside of which laser light passes through, includes the steps of:
    radiating the inside with cleaning laser light; and
    at a time of the radiation of the cleaning laser light, purging the inside with a predetermined purge gas to thereby remove contaminants.

According to the above cleaning method, the contaminants isolated by radiation of the cleaning laser light are exhausted to be discharged from the inside of the casing, whereby the inside of the casing can be cleaned. Accordingly, when the casing is incorporated into the laser device, even if the inside of the casing is radiated with laser light, a contaminant hardly generates. Accordingly, it hardly happens that the optical components placed in the inside of the casing are contaminated and damaged. Thus the power reduction of the laser light seldom occurs and the lives of the optical components are increased.

Further, in the method of cleaning the casing for the laser device,
the cleaning laser light comprises ArF cleaning laser light oscillated from an ArF laser light radiating device; and
the purge gas may contain oxygen.

According to the above cleaning method, it becomes possible that the organic matters adhering to the inside of the casing is efficiently made gases to be isolated by oxygen, the ArF cleaning laser light, and ozone generating from the oxygen. Accordingly, the organic matters remaining in the inside of the casing are decreased, thus making it possible to perform cleaning with greater thoroughness.

Further, in the method of cleaning the casing for the laser device,
the cleaning laser light may comprise F2 cleaning laser light oscillated from an F2 molecular laser light radiating device; and
the purge gas may be an inert gas.

According to the above cleaning method, oxygen hardly exists in the inside of the casing, and therefore the F2 cleaning laser light is hardly attenuated. Accordingly, the F2 cleaning laser light is radiated to the inside of the casing with high intensity, whereby cleaning is performed more efficiently. Further, since the F2 cleaning laser light has a short wavelength, the light quantum energy is large, and thus it has a higher efficiency of cleaning off the contaminants. Accordingly, when the casing cleaned with the F2 cleaning laser light is assembled to, for example, the laser device, the contaminants isolated by the laser light are fewer.

Further, in the method of cleaning the casing for the laser device,
radiation of the cleaning laser light, radiation of the ArF cleaning laser light, or radiation of the F2 cleaning laser light may be performed by scattering it to substantially an entire area of the inside.

According to the above cleaning method, it becomes possible to radiate each cleaning laser light to substantially the entire area of the inside of the casing by scattering it, whereby most of the contaminants adhering to substantially the entire area of the inner wall of the casing and the components placed in the inside can be removed.

Furthermore, in the method of cleaning the casing for the laser device,
optical components may be assembled to the inside.

According to the above cleaning method, both of the casing and the optical components are cleaned, and when the casing is assembled to the laser device, it hardly happens that contaminants come out of the casing and the optical components. Further, since cleaning is performed in an assembled state, the chance of a human hand touching the casing and the optical components after cleaning is reduced, and it hardly happens that the cleaned casing, optical components and the like are contaminated and damaged.

BEST MODE FOR CARRYING OUT THE INVENTION

Preferred embodiments according to the present invention will be explained in detail below with reference to the drawings.

Figure 1:
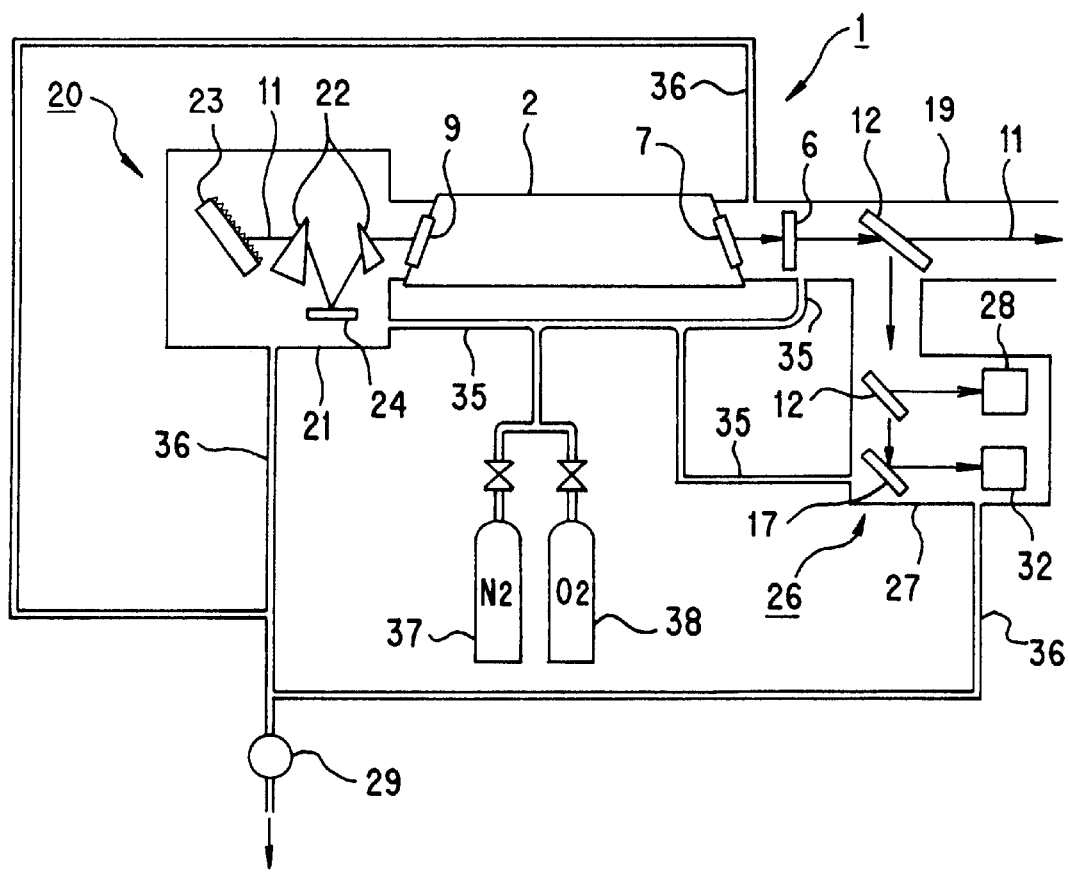
FIG. 1 is a block diagram of an excimer laser device with a bandwidth of a wavelength being narrowed, which is used in the present invention.

First, an excimer laser device will be explained in detail. FIG. 1 shows a configuration of an excimer laser device 1 of which bandwidth of a wavelength is narrowed. In FIG. 1, the excimer laser device 1 includes a laser chamber 2 in which a laser gas sealed inside is excited by electric discharge to thereby oscillate excimer laser light 11. At a rear of the laser chamber 2 (the left side in FIG. 1), placed is a band-narrowing unit 20 for narrowing a bandwidth of a spectrum of the excimer laser light 11. Further, in front of the laser chamber 2, placed is a monitor module 26 for measuring power and a wavelength of the oscillated excimer laser light 11.

A front portion and a rear portion of the laser chamber 2 are sealed by a front window 7 and a rear window 9 for transmitting the excimer laser light 11. The excimer laser light 11 oscillated by discharge between discharge electrodes not shown inside the laser chamber 2 passes through the rear window 9 and is incident on the band-narrowing unit 20. The band-narrowing unit 20 includes a band-narrowing box 21, and in an inside thereof, prisms 22 and 22, a grating 23 and a tuning mirror 24 are respectively placed at predetermined positions. The excimer laser light 11 has its beam diameter expanded by the prisms 22 and 22, and has a bandwidth of its wavelength narrowed by the grating 23. The tuning mirror 24 controls a center wavelength of the excimer laser light 11 by controlling an incident angle of the excimer laser light 11 on the grating 23. Further, optical component holders not shown for adjusting and fixing the positions of the optical components such as the grating 23 and the like are placed inside the band-narrowing box 21.

The excimer laser light 11 with the bandwidth being narrowed in the band-narrowing unit 20 passes through the rear window 9, the front window 7 and the front mirror 6, and is emitted forward through an inside of a cover 19. The excimer laser light 11 emitted outside the excimer laser device 1 through a beam splitter 12 is incident on a processing machine such as a stepper not shown through the cover 19 to be a light source for processing. In this situation, part of the excimer laser light 11 is reflected downward in FIG. 1 by the beam splitter 12 to be incident on the monitor module 26.

The monitor module 26 includes a monitor box 27. A power detector 32 for measuring peak energy or pulse energy for each pulse of the excimer laser light 11 and a wavelength detector 28 for measuring a center wavelength and spectrum width of the excimer laser light 11 are placed inside the monitor box 27. The beam splitter 12 and a mirror 17 are placed on an optical axis of the excimer laser light 11 to let the excimer laser light 11 be incident on the wavelength detector 28 and the power detector 32 respectively. Further, optical component holders not shown for adjusting and fixing positions of the components such as the mirror 17, the detectors 28 and 32 and the like are placed inside the monitor box 27.

Further, the excimer laser device 1 includes an optical inspection device 34 for performing a radiation test for the optical components to be used inside the eximer laser device 1. The optical inspection device 3 is placed in front of the excimer laser device 1 only at the time of inspection and performs inspection of an optical component by being radiated with the excimer laser light 11.

Figure 2:
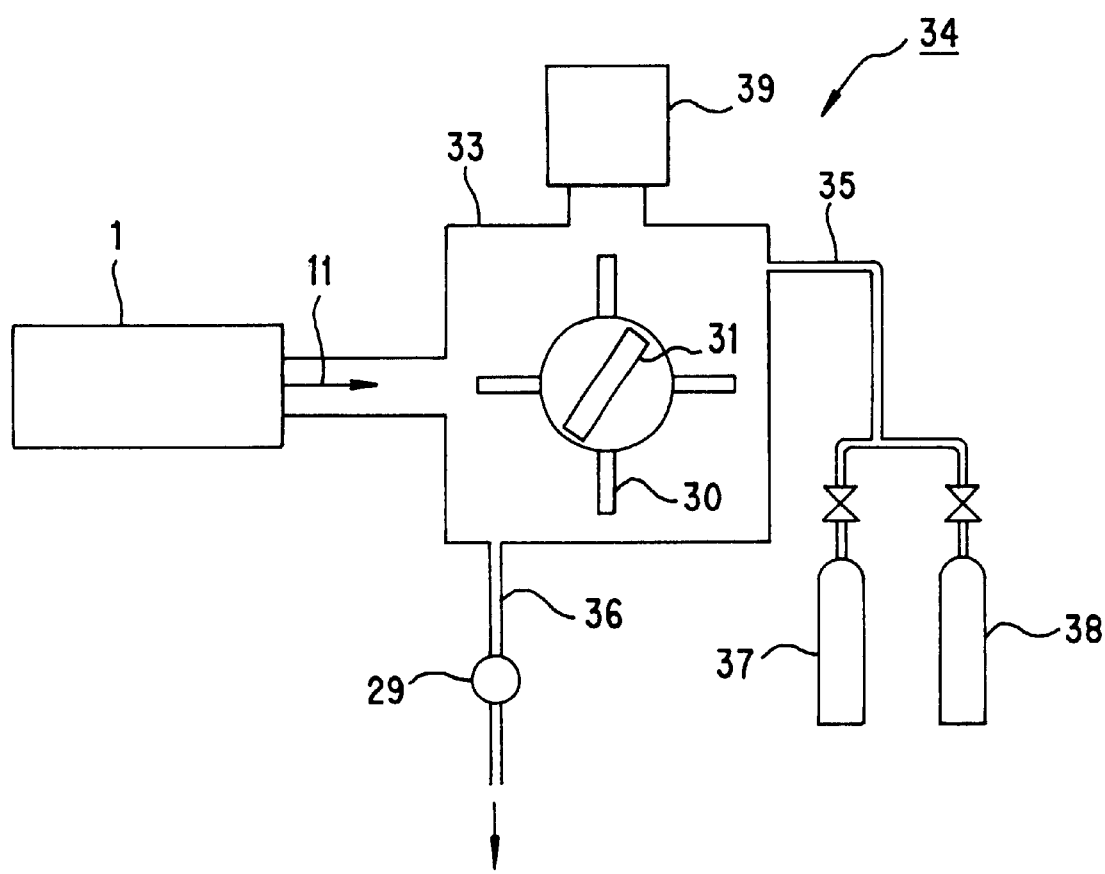
FIG. 2 is a block diagram in a case in which inspection of optical components is performed with use of an optical inspection device in the present invention.

FIG. 2 shows a configuration in which inspection of a component 31 to be inspected such as an optical component is performed using the optical inspection device 34. In FIG. 2, an optical inspection box 33 is placed in front of the excimer laser device 1, and an optical component holder 30 not shown for fixing and moving the component 31 to be inspected is placed inside the optical inspection box 33. The component 31 to be inspected being the inspection target is placed on the optical component holder 30, and the excimer laser light 11 is oscillated by a predetermined number of pulses from the excimer laser device 1 to be radiated to an inside of the optical inspection box 33. Subsequently, change in characteristics of the component 31 to be inspected is measured by an inspection device 39 attached to the optical inspection box 33.

Hereinafter, the cover 19 an inside of which the excimer laser light 11 passes through, the band-narrowing box 21, the monitor box 27, and the optical inspection box 33 are generally referred to as the casings 19, 21, 27 and 33. These casings 19, 21, 27 and 33 are made of, for example, aluminum, and black electroless nickel plating is applied to inner walls thereof. In the explanation below, the inner walls of the casings 19, 21, 27 and 33 and surfaces of components such as the optical component holders and the like placed inside the casings 19, 21, 27 and 33 are called inner surfaces of the casings 19, 21, 27, and 33.

In FIG. 1 and FIG. 2, an introduction pipeline 35 for introducing a predetermined gas inside, and an exhaust pipeline 36 for exhausting the introduced gas are connected to an outer wall of each of the casings 19, 21, 27 and 33. An inert gas cylinder 37 filled with an inert gas such as, for example, nitrogen (N2) is connected to the introduction pipeline 35. A vacuum pump 29 for exhausting the inside of each of the aforementioned casings 19, 21, 27 and 33 is connected to the exhaust pipeline 36.

On operating the excimer laser device 1, the vacuum pump 29 is driven to exhaust an inert gas while injecting the inert gas into each of the casings 19, 21, 27 and 33 from the introduction pipeline 35, whereby dust, organic matters and the like occurring inside each of the casings 19, 21, 27 and 33 are removed. The gas introduced into the casings 19, 21, 27 and 33 as described above is called a purge gas, and exhausting the insides of the casings 19, 21, 27 and 33 while introducing the purge gas into the casings 19, 21, 27 and 33 is called purging with the purge gas. The structure as above is almost the same with an F2 laser device.

Figure 3:
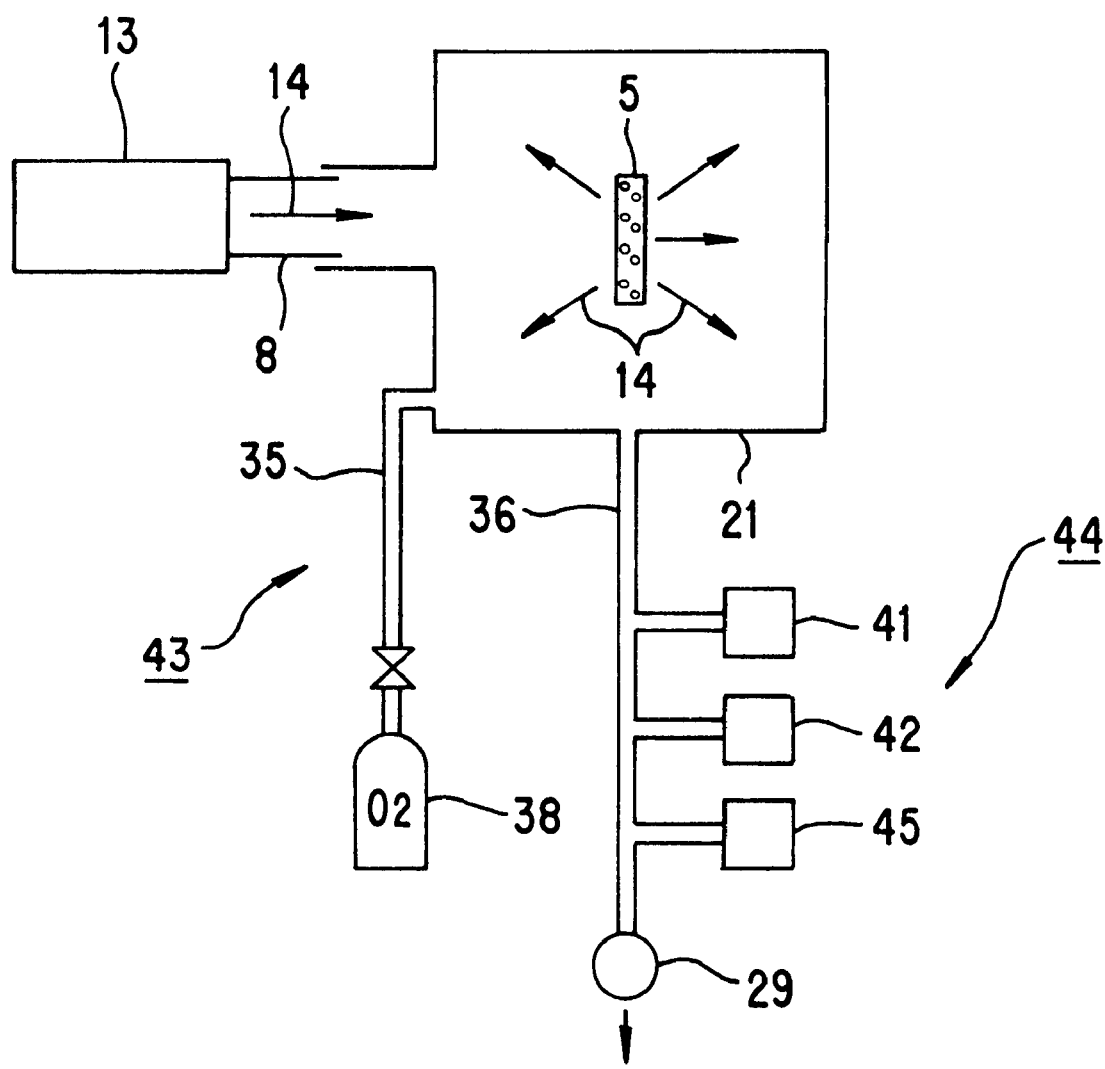
FIG. 3 is a block diagram of a cleaning device according to a first embodiment of the present invention.

FIG. 3 shows a configuration of a cleaning device according to a first embodiment. In FIG. 3, the cleaning device includes an ArF laser light radiating device 13 for emitting ArF laser light of a wavelength of about 193 nm. The ArF laser light emitted from the ArF laser light radiating device 13 is called ArF cleaning laser light 14. Any one of the band-narrowing box 21, the monitor box 27 and the optical inspection box 33 is placed in front of the ArF laser light radiating device 13, and the explanation here is made on the assumption that the band-narrowing box 21 is placed. An optical component holder not shown is placed inside the band-narrowing box 21. When the optical inspection box 33 is cleaned, the optical inspection box 33 is placed in front of the ArF laser light radiating device 13 with the optical component holder 30 being placed therein.

The ArF laser light radiating device 13 and the band-narrowing box 21 are connected by a duct 8. Small spaces are provided between the ArF laser light radiating device 13 and the duct 8, and the duct 8 and the band-narrowing box 21, and from the spaces, the purge gas leaks outside. A scattering optical component 5 constituted by obscured glass and the like, for scattering the ArF cleaning laser light 14 in all directions is placed inside the band-narrowing box 21.

The introduction pipeline 35 and the exhaust pipeline 36 are connected to the outer wall of the band-narrowing box 21. An oxygen mixture gas cylinder 38 filled with oxygen ($O_2$) diluted with an inert gas such as nitrogen is connected to the introduction pipeline 35. The introduction pipeline 35 and the gas cylinder are called a gas introduction mechanism 43. Further, the vacuum pump 29 for exhausting the inside of the band-narrowing box 21 is connected to the exhaust pipeline 36. The exhaust pipeline 36 and the vacuum pump 29 are called a gas exhaust mechanism 44. Furthermore, a particle counter 41 for counting the number of particles contained in the exhausted gas, an organic matter detector 42 for detecting the concentration of organic matters, and a water content monitor 45 for detecting an amount of water are connected to the exhaust pipeline 36.

On cleaning the inside of the band-narrowing box 21, the vacuum pump 29 is driven to exhaust the band-narrowing box 21 while the oxygen mixture gas is being injected into the band-narrowing box 21 from the introduction pipeline 35. After a lapse of a predetermine period of time, at the right time when the oxygen concentration inside the band-narrowing box 21 becomes a predetermined concentration or more, the ArF cleaning laser light 14 is radiated to the inside of the band-narrowing box 21. In this situation, a detector for detecting the oxygen concentration inside the band-narrowing box 21 may be connected to the exhaust pipeline 36.

As for the ArF cleaning laser light 14, the excimer laser light 11 emitted from the excimer laser device 1 may be used, but the laser light with at least one of the peak power and the oscillation frequency being larger than the excimer laser light 11 is preferable. Further, the ArF cleaning laser light 14 may not have a wavelength of which bandwidth is narrowed.

The ArF cleaning laser light 14 incident on the inside of the band-narrowing box 21 is scattered in all directions by the scattering optical component 5, and is radiated all over the inside surface of the band-narrowing box 21. In this situation, part of oxygen chemically reacts by the ArF cleaning laser light 14 to become ozone ($O_3$). As a result, chemical reactions expressed by the following reaction formulas (1) and (2) occur to organic matters adhering to the inner wall of the band-narrowing box 21, and the inside components such as the optical component holder and the like by the oxygen, ozone and the ArF cleaning laser light 14. $CO_2$ and $H_2O$ are both gases. The organic matters are adhering to the inside surface in a solid or a liquid state.

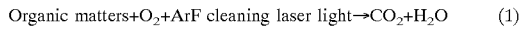

$$\text{Organic matters} + O_2 + \text{ArF cleaning laser light} \rightarrow CO_2 + H_2O \quad (1)$$

$$\text{Organic matters} + O_3 \rightarrow CO_2 + H_2O \quad (2)$$

As described above, the organic matters adhering to the inside surfaces of the casings 19, 21, 27 and 33 are decomposed into $CO_2$ and $H_2O$ to be gases and are isolated inside the band-narrowing box 21. By exhausting the gases by the vacuum pump 29, the organic matters inside the band-narrowing box 21 can be removed. At this time, it is preferable to detect the concentration of the organic matters inside the band-narrowing box 21 by means of the organic matter detector 42, and to continue radiation of the ArF cleaning laser light 14 continued until the concentration becomes a predetermined concentration or less. Thus, it can be confirmed that the organic matters are surely removed.

In this situation, it sometimes happens that the contaminants such as inorganic salt, organic matters and the like adhering to the inside surfaces of the casings 19, 21, 27 and 33 become very small solids and suspend. In some cases, water adhering to the inside surfaces is decomposed to be oxygen and the like. In order to remove them with reliability, it is preferable to continue radiation of the ArF cleaning laser light 14 until it is confirmed that the amounts of particles and water contained in the exhausted gas are predetermined amounts or less by the particle counter 41 and the water content monitor 45. This reduces generation of contaminants such as particles and water as well as vaporized organic matters from the inside surfaces of the casings 19, 21, 27 and 33.

Subsequently, as shown in FIG. 1, optical components such as the grating 23 and the like are assembled to the band-narrowing box 21 and the optical component holder with most of the organic matters adhering to the inside surface being removed by the cleaning device to thereby construct the band-narrowing unit 20. In this manner, cleaning is performed for each of the aforementioned casings 19, 21, 27 and 33, and the predetermined optical components are assembled thereto, whereby the excimer laser device 1 is constructed. As a result, even if the excimer laser light 11 strikes the inner walls and the optical component holders of the casings 19, 21 and 27 on oscillation of the excimer laser device 1, it hardly happens that the contaminants such as organic matters and the like become gas and separated therefrom. Accordingly, it seldom happens that the contaminants adhere to the optical components, thus making it possible to operate the excimer laser device 1 with stability.

According to the first embodiment as explained above, the inside surfaces of the casings 19, 21 and 27 into which the optical components are incorporated are radiated with the ArF cleaning laser light 14 emitted from the ArF laser light radiating device 13. As a result, when the excimer laser device 1 is oscillated, it hardly happens that the contaminants such as organic matters and the like occur to the insides of the casings 19, 21 and 27, and thus the optical components therein are not contaminated or damaged. Accordingly, power reduction of the excimer laser light 11 and characteristics reduction of the optical components do not occur, thus making it possible to operate the excimer laser device 1 with stability. Further, the lives of the optical components increase, and the frequency of replacement and cleaning decreases.

Also in this case, at least one of the peak power and the oscillation frequency of the ArF cleaning laser light 14 is made larger than that of the excimer laser light 11 of the excimer laser device 1 into which the casings 19, 21 and 27 are incorporated. As a result, since the insides of the casings 19, 21 and 27 are cleaned with larger energy, organic matters are hardly generated therein by the excimer laser light 11 in the case in which the casings 19, 21 and 27 are assembled to the excimer laser device 1. Further, the inside of the optical inspection box 33 is also cleaned by the ArF cleaning laser light 14, and therefore when the characteristics of the component 31 to be inspected are measured by the optical inspection device 34, organic matters and the like do not generate inside, thus making it possible to perform accurate measurement.

Further, since the scattering optical component 5 is provided, it is possible to radiate the ArF cleaning laser light 14 to the entire area of the insides of the casings 19, 21, 27 and 33 without fail. Consequently, the adhering contaminants can be removed more securely. In this situation, for example, by rotating the scattering optical component 5, the ArF cleaning laser light 14 is radiated to the entire inside part more securely, and therefore it is more preferable. The scattering optical component 5 is explained as obscured glass, but, for example, a mirror with irregularities on its surface, a convex mirror, or a polygon mirror may be also suitable. Further, it is explained that the optical components are placed inside the casings 19, 21, 27 and 33, but the present invention is effective for a casing such as a duct in which only laser light passes through and no optical components are placed. Specifically, by cleaning the inside of such a casing, the contaminants can be prevented from generating to change the refractivity and absorb the laser light 11.

Figure 4:
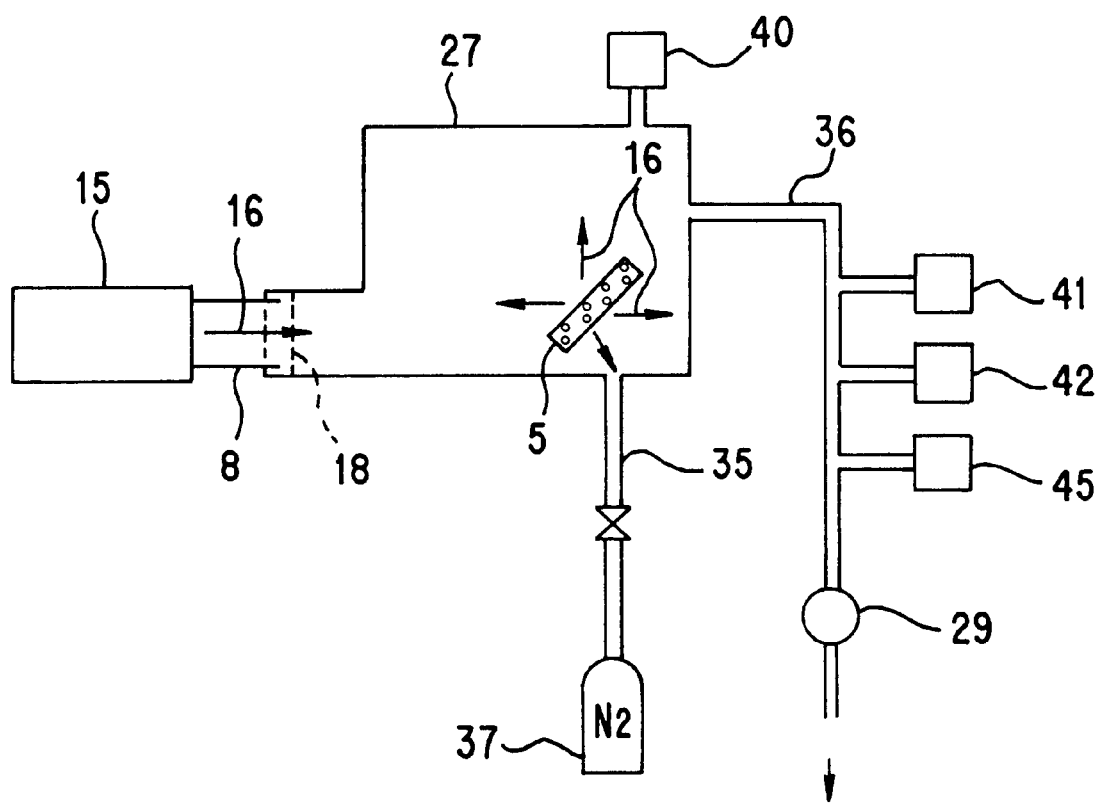
FIG. 4 is a block diagram of a cleaning device according to a second embodiment of the present invention.

Next, a second embodiment will be explained. FIG. 4 shows a configuration of a cleaning device according to the second embodiment. The cleaning device shown in FIG. 4 includes an F2 molecular laser light radiating device 15 for emitting F2 molecular laser light of a wavelength of about 157 nm as F2 cleaning laser light 16. It is the same as the first embodiment that the monitor box 27 is placed in front of the F2 molecular laser light radiating device 15, as an example. The inert gas cylinder 37 filled with an inert gas such as nitrogen ($N_2$), rare gas and the like is connected to the introduction pipeline 35 of the monitor box 27. Further, the oxygen concentration detector 40 is connected to the monitor box 27 so that the oxygen concentration therein can be detected.

The F2 molecular laser light radiating device 15 and the monitor box 27 are connected by the duct 8. A space between the F2 molecular laser light radiating device 15 and the duct 8, and a space between the duct 8 and the monitor box 27 are sealed so that the purge gas does not leak outside. In this situation, if a window 18 through which the F2 cleaning laser light 16 passes is provided at an entrance of the monitor box 27, on which the F2 cleaning laser light 16 is incident, the monitor box 27 can be sealed more securely.

When removing organic matters, the inside of the monitor box 27 is initially purged by an inert gas. Subsequently, the oxygen concentration inside the monitor box 27 is detected by the oxygen concentration detector 40, and after the oxygen concentration becomes, for example, 10 ppm or less, the F2 cleaning laser light 16 is radiated to an inside of the monitor box 27. The oxygen concentration of 10 ppm is the concentration at which the absorption ratio of the F2 molecular laser light into oxygen is rapidly lowered.

Specifically, the F2 cleaning laser light 16 of a wavelength of about 157 nm is absorbed in oxygen well and attenuated. In order to prevent the attenuation, the F2 cleaning laser light 16 is radiated in a state in which oxygen is removed from the inside of the monitor box 27. Consequently, the F2 cleaning laser light 16 is radiated to the inside of the monitor box 27 without being attenuated. In this situation, as the inert gas, nitrogen and helium (He) with especially low absorption ratio with respect to the F2 laser cleaning light are preferable.

The organic matters adhering to the inside surface of the monitor box 27 chemically react by the F2 cleaning laser light 16 and becomes low-molecular organic matters to be vaporized. Exhausting this with the vacuum pump 29 reduces generation of organic matters inside the monitor box 27 when the monitor box 27 is used for the F2 laser device and the excimer laser device 1. In this situation, the concentration of the organic matters exhausted from the exhaust pipeline 36 is detected by the organic matter detector 42, and radiation of the F2 cleaning laser light 16 is continued until the concentration becomes a predetermined concentration or less.

Further, as a result that the F2 cleaning laser light 16 is radiated to the inside surface of the monitor box 27, inorganic salt such as $CaCO_3$ and the like adhering to the surface of the inner wall and the like is decomposed, whereby oxygen generates. Accordingly, the oxygen concentration inside the monitor box 27 is detected by the oxygen concentration detector 40, and the F2 cleaning laser light 16 is radiated into the monitor box 27 until the oxygen concentration becomes a predetermined value or less. As a result, when the monitor box 27 is assembled to the F2 laser device, it hardly happens that oxygen generates therein and the F2 molecular laser light is attenuated.

Further, as in the first embodiment, the amounts of the particles and water contained in the exhausted gas are detected by the particle counter 41 and the water monitor 45. Subsequently, it is suitable to continue radiation of the F2 cleaning laser light 16 until it is confirmed that both of them become predetermined amounts or less.

According to the second embodiment as explained above, the F2 cleaning laser light 16 is radiated in the state in which oxygen is removed from the insides of the casings 19, 21, 27 and 33. Thus, the F2 cleaning laser light 16 is radiated to the inside surfaces of the casings 19, 21, 27 and 33 with high intensity without being absorbed in oxygen and attenuated, and organic matters, water, inorganic salt or the like adhering thereto can be removed efficiently. As a result, when the F2 molecular laser light is radiated from the F2 laser device in which the casings 19, 21 and 27 are incorporated, generation of oxygen is reduced, and it hardly happens that the F2 molecular laser light is absorbed and power is attenuated. Further, it hardly happens that organic matters and the like adhere to the surfaces of the optical components, and therefore power reduction of the F2 molecular laser light hardly happens.

In this situation, it is preferable that the intensity of the F2 cleaning laser light 16 is made higher than the intensity of the F2 molecular laser light oscillated from the F2 laser device in which the casings 19, 21, 27 and 33 are incorporated. Thereby, even if the F2 molecular laser light is radiated to the casings 19, 21, 27 and 33, a contaminant hardly generates from them.

Further, the wavelength of the F2 cleaning laser light 16 is about 157 nm, which is shorter than the wavelengths of KrF excimer laser light (about 248 nm) and ArF excimer laser light (about 193 nm). Specifically, the F2 cleaning laser light 16 has stronger light quantum energy than excimer laser light. Accordingly, when being radiated with the F2 cleaning laser light 16 with high cleaning power, adherents attached on the inside surfaces of the casings 19, 21, 27 and 33 chemically react to easily come off and are removed more easily than when being radiated with the ArF cleaning laser light 14.

The light quantum energy of the F2 cleaning laser light 16 is especially sufficient to cut the chemical bonding of organic matters, but on the other hand, the light quantum energy of the ArF cleaning laser light 14 sometimes cannot cut the chemical bonding of organic matters completely. Specifically, the F2 cleaning laser light 16 is extremely preferable for removing organic matters.

Further, the F2 cleaning laser light 16 is radiated in the state in which the optical component holders for fixing the optical components are incorporated in the casings 19, 21, 27 and 33. Thus, the optical component holders complicated in their shapes with large surface areas are also cleaned by the F2 cleaning laser light 16, whereby the insides of the casings 19, 21, 27 and 33 become cleaner. Accordingly, it hardly happens that the optical components are contaminated and damaged and the F2 laser light 11 is absorbed, thus making it possible to operate the laser device with stability.

The casings 19, 21, 27 and 33 radiated with the F2 cleaning laser light 16 may be incorporated into the excimer laser device 1 as well as the F2 laser device. If the casings 19, 21, 27 and 33 are incorporated into the excimer laser device, the adherents hardly react chemically by excimer laser light with lower light quantum energy, and thus power reduction of the excimer laser light and contamination and damage of the optical component are decreased.

Figure 5:
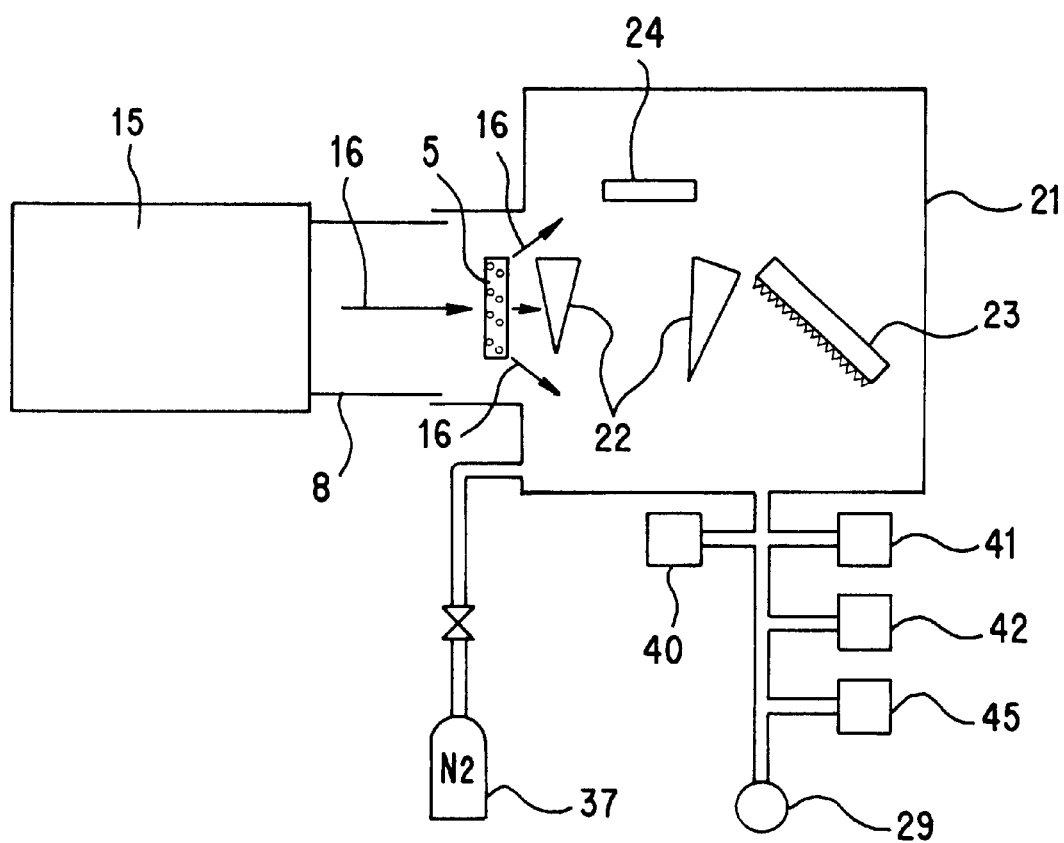
FIG. 5 is a block diagram for removing contaminants with use of the cleaning, device according to the second embodiment.
Figure 6:
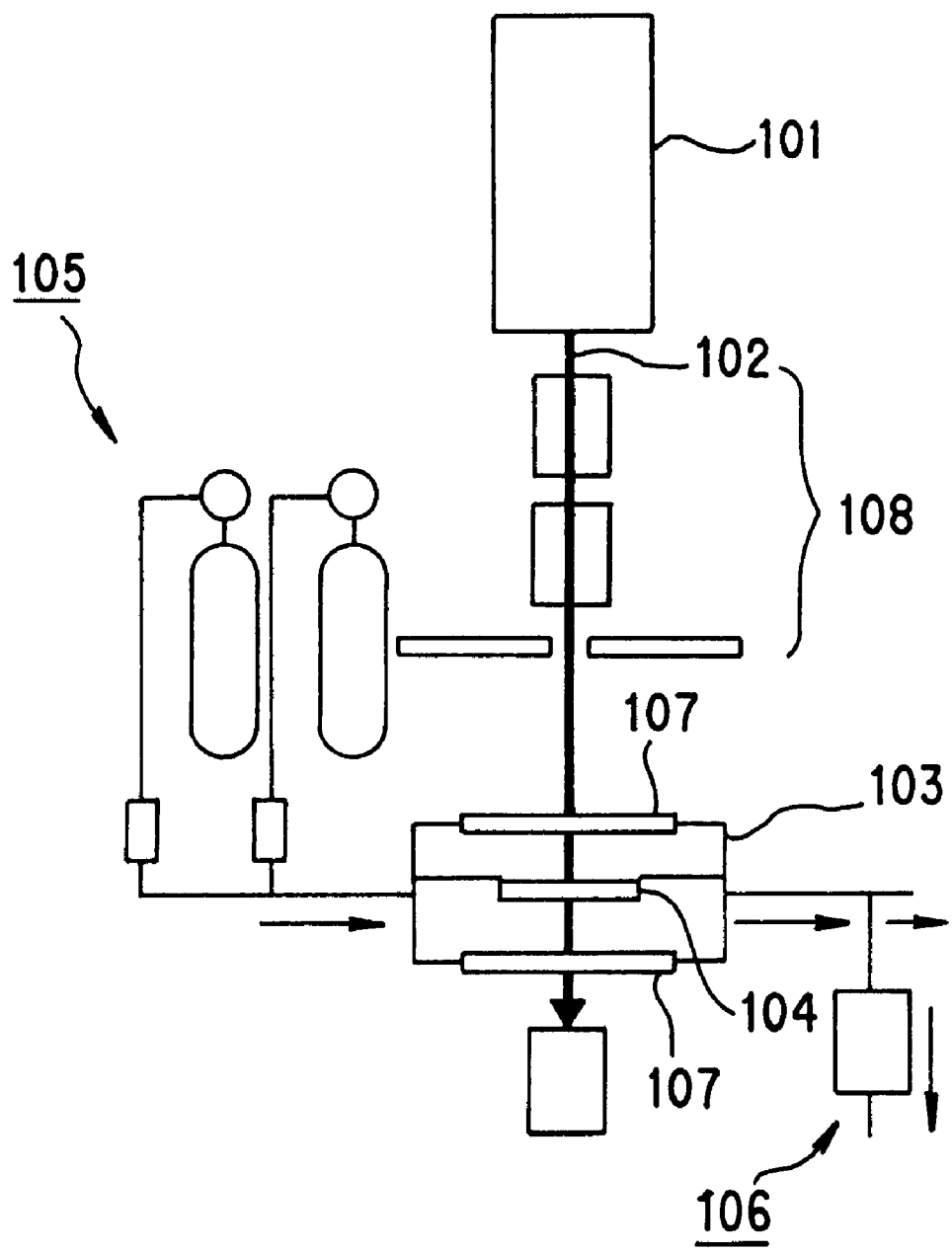
FIG. 6 is a block diagram of a cleaning device according to a prior art.
Figure 7:
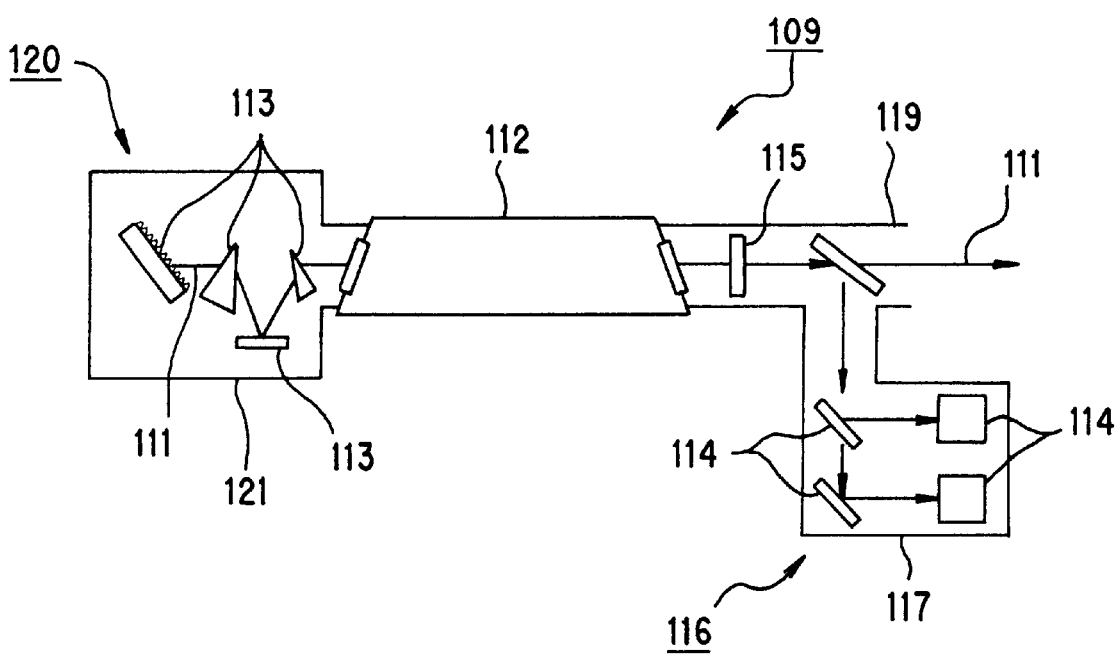
FIG. 7 is a schematic block diagram of an excimer laser device according to the prior art.

Next, an example of a configuration for removing contaminants from the casings 19, 21, 27 and 33 and the optical components by using the cleaning device according to the second embodiment will be shown. In FIG. 5, the band-narrowing box 21 in which the band-narrowing optical component group 22 to 24 such as the prisms 22 and 22, the tuning mirror 24, and the grating 23 are assembled is placed in front of the cleaning device. The scattering optical component 5 constituted by obscured glass and the like is placed at an entrance of the band-narrowing box 21.

The F2 cleaning laser light 16 emitted from the F2 molecular laser light radiating device 15 strikes the scattering optical component 5 at the entrance of the band-narrowing box 21. Part of the F2 cleaning laser light 16 passes through the scattering optical component 5, and the remaining part of it is irregularly reflected at the scattering optical component 5 or has its traveling direction bent inside the scattering optical component 5. The F2 cleaning laser light 16 passing through the scattering optical component 5 is radiated to the aforementioned band-narrowing optical component group 22 to 24. The F2 cleaning laser light 16 irregularly reflected at or has its traveling direction bent in the scattering optical component 5 is radiated to the inside of the band-narrowing box 21.

As described above, the F2 cleaning laser light 16 is radiated to the band-narrowing box 21 with the band-narrowing optical component group 22 to 24 being assembled to the band-narrowing box 21. Thus, not only the contaminants adhering to the inside surface of the band-narrowing box 21 but also the contaminants adhering to the band-narrowing optical component group 22 to 24 chemically react with the F2 cleaning laser light 16 to become gases, and are exhausted. Consequently, it becomes possible to remove contaminants from all the components inside the band-narrowing box 21.

The band-narrowing box 21 in which the band-narrowing optical component group 22 to 24 as described above is incorporated into the excimer laser device 1 and the F2 laser device as the band-narrowing unit 20. Thereby, generation of contaminants is extremely reduced when the excimer laser light 11 and the F2 molecular laser light are radiated, and thus the power reduction of the laser light and contamination and damage of the optical components are further decreased. Further, as compared with the case in which the band-narrowing optical component group 22 to 24 and the band-narrowing box 21 are cleaned separately and assembled, contamination and damage of these components while being assembled are eliminated in this embodiment, thus making it possible to obtain the cleaner band-narrowing unit 20.

In this case, it is more preferable to previously clean the band-narrowing box 21 and the optical component holders with the F2 cleaning laser light 16, thereafter incorporate the band-narrowing component group 22 to 24 into the band-narrowing box 21, and clean all of them. Consequently, the organic matters generating when the single body of the band-narrowing box 21 is cleaned do not adhere to the band-narrowing optical component group 22 to 24, and thus the band-narrowing optical component group 22 to 24 becomes cleaner.

What is claimed is:

1. A method of producing a casing for a laser device, an inside of which laser light from a laser chamber passes through, comprising:

a radiation step of radiating said inside of said casing with cleaning laser light; and a purge step of purging said inside of said casing with a predetermined purge gas at a time of the radiating with said cleaning laser light.

2. A method of cleaning a casing for a laser device, an inside of which laser light from a laser chamber passes through, comprising the steps of:

radiating said inside of said casing with cleaning laser light; and at a time of the radiating with said cleaning laser light, purging said inside of said casing with a predetermined purge gas to thereby remove contaminants.

3. The method of cleaning the casing for the laser device according to claim 2, wherein the radiation of said cleaning laser light is scattered to substantially an entire area of said inside of said casing with use of a scattering optical component.

4. The method of cleaning the casing for the laser device according to claim 2, wherein said cleaning laser light comprises ArF cleaning laser light oscillated from an ArF laser light radiating device; and wherein said purge gas contains oxygen.

5. The method of cleaning the casing for the laser device according to claim 4, wherein radiation of said ArF cleaning laser light is scattered to substantially an entire area of said inside of said casing with use of a scattering optical component.

6. The method of cleaning the casing for the laser device according to claim 2, wherein said cleaning laser light comprises $F_2$ cleaning laser light oscillated from an $F_2$ molecular laser light radiating device; and wherein said purge gas comprises an inert gas.

7. The method of cleaning the casing for the laser device according to claim 6, wherein the radiation of said $F_2$ cleaning laser light is scattered to substantially an entire area of said inside of said casing with use of a scattering optical component.

8. The method of cleaning the casing for the laser device according to any one of claim 2 to claim 7, wherein optical components for the laser light from said laser chamber are assembled in said inside of said casing.

* * * * *

UNITED STATES PATENT AND TRADEMARK OFFICE
CERTIFICATE OF CORRECTION

PATENT NO. : 6,627,843 B2
DATED : September 30, 2003
INVENTOR(S) : Yasuo Itakura et al.

It is certified that error appears in the above-identified patent and that said Letters Patent is hereby corrected as shown below:

Title page,
Item [73], Assignee, change "Arms Komatsu Ltd., Tokyo, (JP)" to be
-- Komatsu Ltd., Tokyo, (JP) --.

Signed and Sealed this

Twenty-seventh Day of January, 2004

JON W. DUDAS
*Acting Director of the United States Patent and Trademark Office*